(12) United States Patent
Jones et al.

(10) Patent No.: US 6,955,085 B2
(45) Date of Patent: Oct. 18, 2005

(54) OPTICAL ACCELEROMETER OR DISPLACEMENT DEVICE USING A FLEXURE SYSTEM

(75) Inventors: Richard Todd Jones, Hamden, CT (US); Trevor MacDougall, Simsbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 45 days.

(21) Appl. No.: 10/452,124

(22) Filed: Jun. 2, 2003

(65) Prior Publication Data

US 2004/0237648 A1 Dec. 2, 2004

(51) Int. Cl.[7] ............................. G01P 15/13; G01D 5/34; G01J 1/04; G01J 4/00; G01L 1/54
(52) U.S. Cl. ........................... 73/514.26; 250/231.1; 250/227.14; 250/227.18; 73/800
(58) Field of Search ..................... 250/227.23, 227.18, 250/227.14, 231.1; 73/514.26, 800; 385/134–135, 137, 147, 12, 13; 356/447, 614, 72, 477, 478

(56) References Cited

U.S. PATENT DOCUMENTS

| | | | |
|---|---|---|---|
| 5,289,719 A | 3/1994 | Egley et al. ................ | 73/497 |
| 6,175,108 B1 | 1/2001 | Jones et al. ............. | 250/227.14 |
| 6,422,084 B1 | 7/2002 | Fernald et al. .............. | 73/705 |
| 6,439,055 B1 | 8/2002 | Maron et al. ............... | 73/705 |

FOREIGN PATENT DOCUMENTS

| FR | 2821433 | 8/2002 | |
|---|---|---|---|
| JP | 10300771 | 11/1998 | |
| JP | 2000230935 A | * 8/2000 | ........... G01P/15/03 |
| JP | 2004177357 | 6/2004 | |

OTHER PUBLICATIONS

U.S. Appl. No. 10/393,557, filed Mar. 21, 2003, Jones et al.
U.S. Appl. No. 09/410,634, filed Oct. 1, 1999, Knudsen et al.
U.S. Appl. No. 10/068,266, filed Feb. 6, 2002, Berg et al.
U.S. Appl. No. 10/371,910, filed Feb. 21, 2003, Kersey et al.
U.S. Appl. No. 09/494,417, filed Jan. 31, 2000, Bailey et al.
U.S. Appl. No. 10/266,903, filed Oct. 6, 2002, Berg et al.
U.K. Search Report, Application No. GB0412232.1, dated Oct. 7, 2004.

* cited by examiner

*Primary Examiner*—Hezron Williams
*Assistant Examiner*—Tamiko Bellamy
(74) *Attorney, Agent, or Firm*—Moser, Patterson & Sheridan

(57) ABSTRACT

Disclosed herein is an accelerometer and/or displacement device that uses a mass coupled to a rhomboidal flexure to provide compression to an optical sensing element preferably having a fiber Bragg grating (FBG). The transducer includes a precompressed optical sensor disposed along a first axis between sides of the flexure. The top portion of the flexure connects to the mass which intersects the flexure along a second axis perpendicular to the first axis. When the mass experiences a force due to acceleration or displacement, the flexure will expand or contract along the second axis, which respectively compresses or relieves the compression of the FBG in the optical sensing element along the first axis. Perturbing the force presented to the FBG changes its Bragg reflection wavelength, which is interrogated to quantify the dynamic or constant force. A temperature compensation scheme, including the use of additional fiber Bragg gratings and thermal compensators axially positioned to counteract thermal effects of the optical sensing element, is also disclosed.

81 Claims, 13 Drawing Sheets

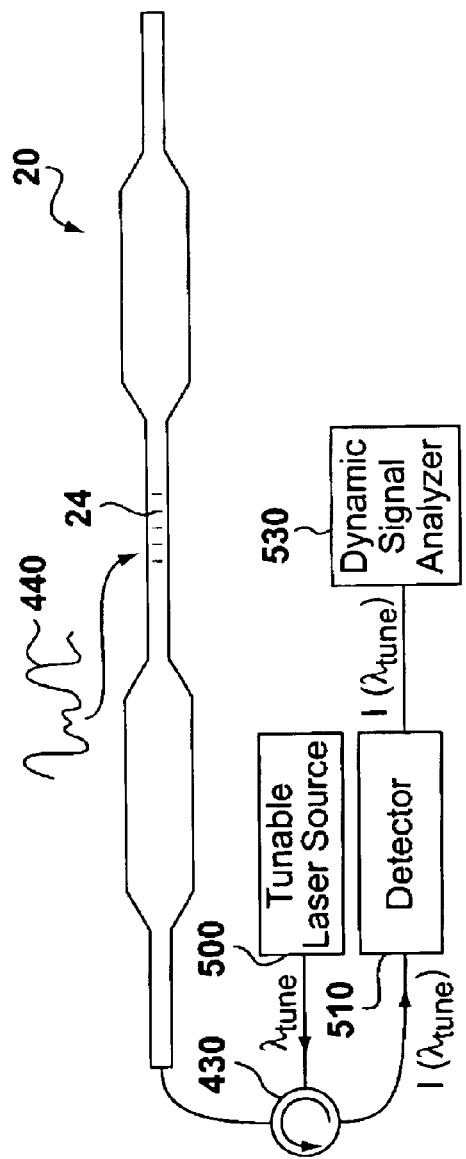
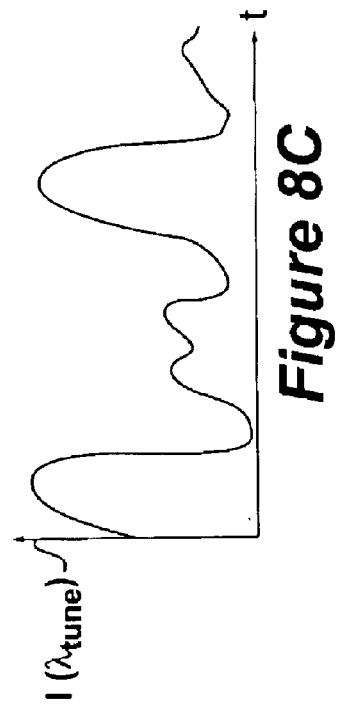
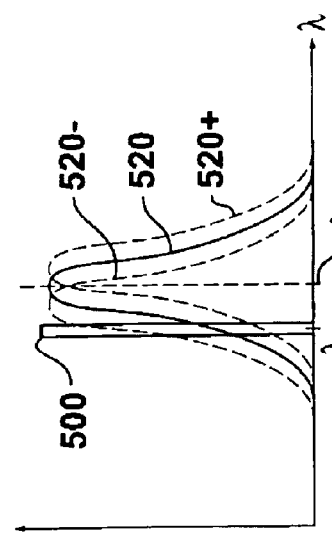
*Figure 8A*
*Figure 8B*
*Figure 8C*

_OPTICAL ACCELEROMETER OR DISPLACEMENT DEVICE USING A FLEXURE SYSTEM_

CROSS REFERENCES TO RELATED APPLICATIONS

U.S. patent application Ser. No. 09/410,634, filed Oct. 1, 1999; Ser. No. 10/068,266, filed Feb. 6, 2002; Ser. No. 10/393,557, entitled "Optical Differential Pressure Transducer Utilizing a Bellows and Flexure System," filed Mar. 21, 2003; and Ser. No. 10/454,101, entitled "An Optical Sensor Using A Long Period Grating Suitable for Dynamic Interrogation," filed concurrently herewith, contain subject matter related to that disclosed herein, and are incorporated herein by reference in their entireties.

TECHNICAL FIELD

This invention relates to optical accelerometers or displacement devices.

BACKGROUND ART

Optical devices for the measurement of acceleration or displacement are known in the art. Such devices have utility in a number of different industrial applications, and specifically have utility in oil/gas applications such as seismology and well-deviation monitoring.

Typically, optical accelerometers or displacement devices operate through a connection of an optical element to a mass usually positioned inside of a housing. As a force acts on the mass, the mass moves within the housing, thereby imparting a stress to the optical element indicative of the force, be it a constant force like gravity, or a varying (dynamic) force as might be experienced in seismic detection. The optical element in such devices is typically an optical fiber, perhaps containing a fiber Bragg grating (FBG). A FBG, as is known, is a periodic or aperiodic variation in the effective refractive index of an optical waveguide, similar to that described in U.S. Pat. Nos. 4,725,110 and 4,807,950 entitled "Method For Impressing Gratings Within Fiber Optics," to Glenn et al. and U.S. Pat. No. 5,388,173, entitled "Method And Apparatus For Forming Aperiodic Gratings In Optical Fibers," to Glenn, which are incorporated by reference in their entireties. As the FBG is stressed by the force, the Bragg reflection wavelength of the FBG shifts accordingly, which may be interrogated to quantify the detected force. An example of such a device is disclosed in U.S. Pat. No. 6,175,108, which is incorporated herein by reference.

Optical fiber accelerometers or displacement devices can also be interrogated by interferometric means. For example, in U.S. patent application Ser. No. 09/410,634, filed Oct. 1, 1999, and Ser. No. 10/068,266, filed Feb. 6, 2002, both of which are incorporated herein by reference, a coil of optical fiber is coupled to or around the mass. The length of this coil is bounded by FBGs, which essentially act as reflectors. By interferometrically assessing reflections from these FBGs, the length of the coil can be determined, which is indicative of the force experienced by the mass.

While these prior art approaches function well to measure acceleration (dynamic forces) or displacement (constant forces), they generally require that the optical element at issue (i.e., the FBG or coil) be pretensioned, as is it not desirable for the optical element to ever become "slack" against the mass during operation. Tensioning of the optical element can lead to shortened lifetimes of the device and raises general reliability concerns in some applications. Additionally, while interferometric interrogation is highly accurate to determine changes of length in optical waveguides, it also requires more extensive optical interrogation systems than does mere assessment of a Bragg wavelength shift from an FBG.

It is known that optical sensors are sensitive to temperature. For example, in an FBG based optical sensor, the FBG will expand or contract in response to increases or decreases in temperature in accordance with the coefficient of thermal expansion (CTE) of the (usually) quartz FBG element. Additionally, the index of refraction of the FBG (or other waveguide) will change with temperature. Changes in temperature will cause the spacing, $\Lambda$, of the grating in the FBG to expand or contract, and will also affect the index of refraction, both of which affects the Bragg reflection wavelength, $\lambda_B$, of the sensor. (As is known and as is explained in the incorporated references, $\lambda_B \propto 2n_{eff}\Lambda$, where $n_{eff}$ is the index of refraction of the core of the waveguide). These temperature-induced Bragg reflection wavelength shifts are preferably compensated for when measuring acceleration or displacement.

Accordingly, there is room for improvement in the art of optical accelerometers and/or displacement devices, and this disclosure provides an alternative approach to the prior art having significant advantages.

SUMMARY OF THE INVENTION

Disclosed herein is an accelerometer and/or displacement device that uses a mass coupled to a rhomboidal flexure to provide compression to an optical sensing element preferably having a fiber Bragg grating (FBG). The transducer includes a precompressed optical sensor disposed along a first axis between sides of the flexure. The top portion of the flexure connects to the mass that intersects the flexure along a second axis perpendicular to the first axis. When the mass experiences a force due to acceleration or displacement, the flexure will expand or contract along the second axis, which respectively compresses or relieves the compression of the FBG in the optical sensing element along the first axis. Perturbing the force presented to the FBG changes its Bragg reflection wavelength, which is interrogated to quantify the dynamic or constant force. A temperature compensation scheme, including the use of additional fiber Bragg gratings and thermal compensators axially positioned to counteract thermal effects of the optical sensing element, is also disclosed.

BRIEF DESCRIPTION OF THE DRAWINGS

FIGS. 8A–8C illustrate a method for interrogation the optical element using a tunable laser source.

DETAILED DESCRIPTION OF THE PREFERRED EMBODIMENTS

Figure 1A:
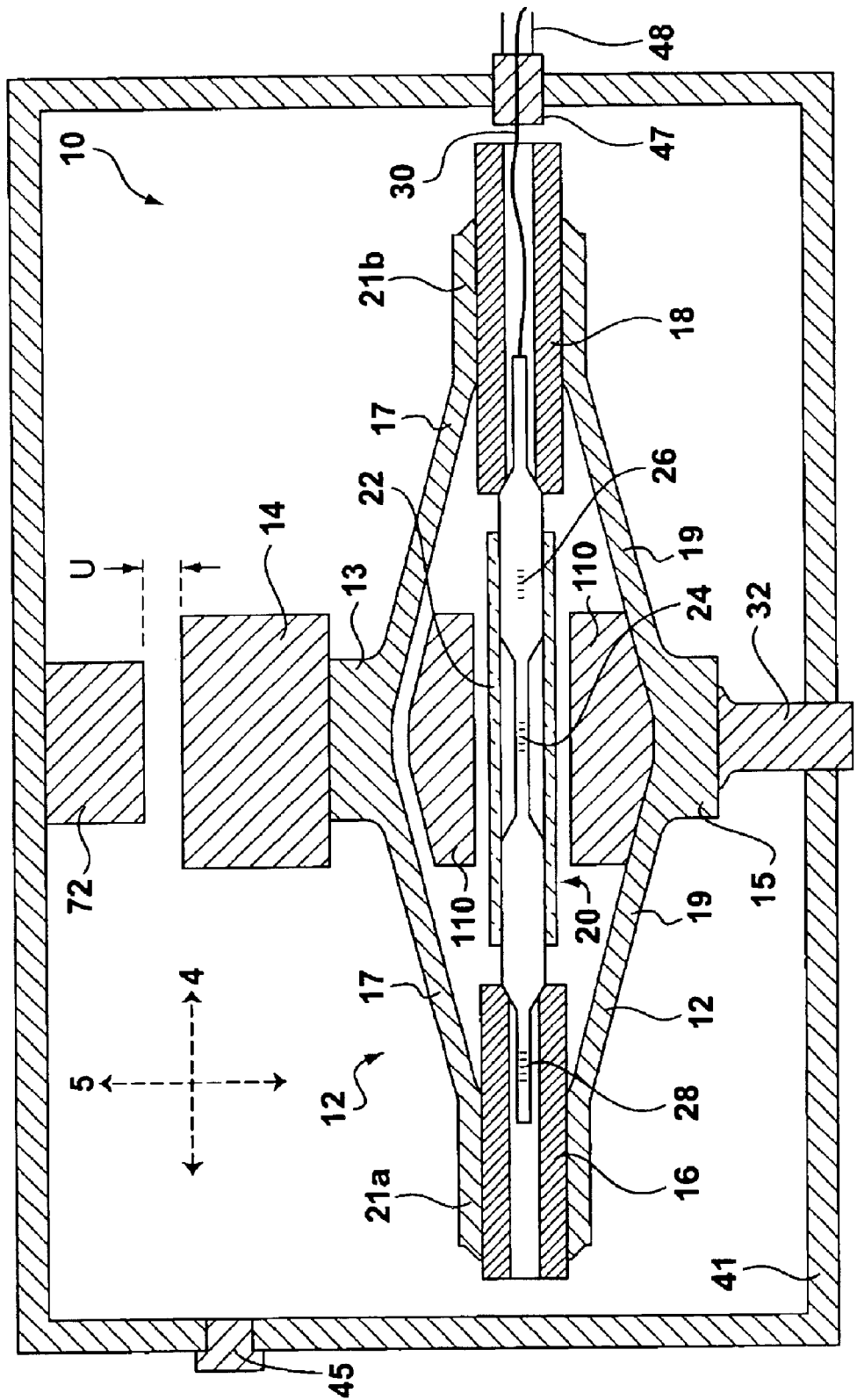
FIG. 1A illustrates a cross sectional view of the disclosed accelerometer or displacement device in an idealized housing.
Figure 1B:
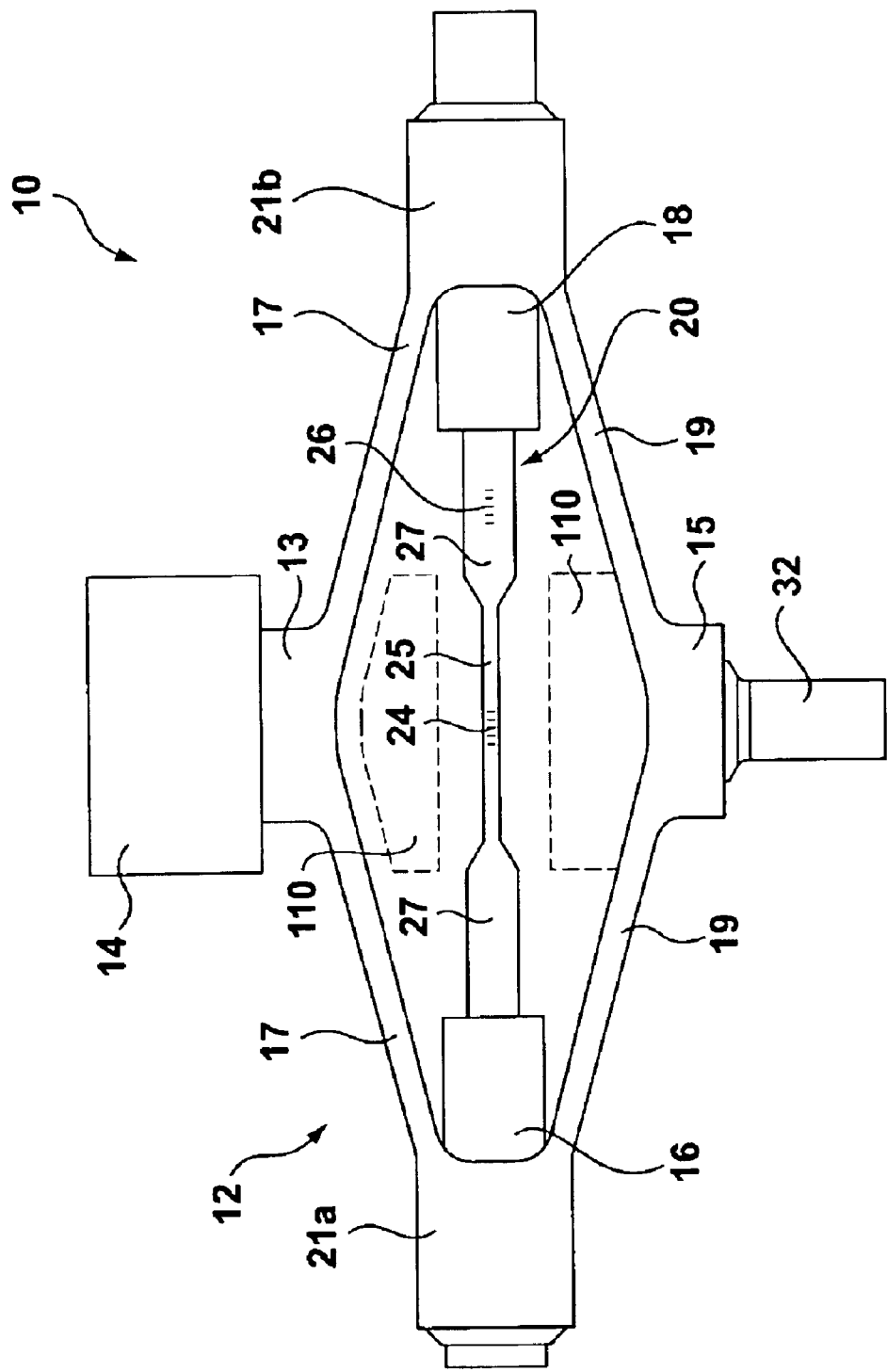
FIG. 1B illustrates a plan view of the disclosed accelerometer or displacement device.

FIGS. 1A and 1B respectively disclose an accelerometer or displacement device 10 (hereinafter sensor 10) in a cross sectional and plan view. The basic components of the sensor 10 include a rhombus-shaped flexure element or spring 12, an optical sensing element 20 containing a force-sensitive FBG 24, and a mass 14. The bottom 15 of the flexure 12 is affixed to a housing 41 at securing pin 32.

In operation, a dynamic or constant force experienced along a second axis 5 will cause the mass 14 to move, which in turn causes the flexure 12 to expand or contract along the second axis 5. This in turn causes first and second end portions 21a and 21b of the flexure 12 to respectively to move towards or away from one another along first axis 4. This movement of the ends 21a and 21b will axially compress or relax the optical sensing element 20, and in particular the force-sensitive grating FBG 24, which causes the Bragg reflection wavelength of the FBG 24 to proportionately shift in accordance with the force.

When used to sense acceleration or displacement, the sensor 10 is preferably housed in a housing 41 (not shown in FIG. 1B for clarity), although this is not strictly required for the sensor to function. The material for housing 41 is preferably Inconel 718, which can withstand the corrosive, high pressure down hole environment for which the sensor 10 was primarily designed, but could be made of any other material depending on the intended environment. Depending on the application at hand, the housing 41 may be filled with a liquid (e.g., silicone oil) or may be gas filled (e.g., with air or an inert gas which will not adversely affect the optical sensing element, such as nitrogen). A filling port covered by a cap 45 is provided to hermetically seal the housing 41 after filling if necessary. For applications in which a static displacement is to be measured, as in the well-deviation monitoring tool to be described later in this disclosure, the housing can be filled with a viscous liquid, as dampening of the motion of the mass 14 will not deleteriously affect operation of the sensor 10. However, if used to measure dynamic forces, as in the seismic sensor tool to be described later in this disclosure, care should taken that dampening of the motion of the mass 14 by the viscosity of the fluid will not mask the dynamic phenomenon being measured, and if so, a lower viscosity oil could be used. In any event, filling the housing 41 with a fluid is generally preferred as it reduces the device response at and near resonance and tends to prevent jarring impact forces from damaging the sensor 10.

The flexure 12 is a flexible body that includes a top portion 13 affixed to the mass 14. Any suitable attachment techniques may be used to affix the mass, such as brazing, adhesive bonding or bolting, but welding is preferred as it is particularly stable for the oil/gas well applications for which this design was primarily envisioned. The bottom portion 15 is affixed to a securing pin 32 by laser welding (not shown), but can also be integrally formed with the base portion or threaded in place. The flexure 12 further includes upper arms 17 and lower arms 19, which as noted previously mechanically cooperate in a spring-like fashion. The flexure 12 is preferably made from a low coefficient of thermal expansion material, such as for example a metal alloy, Invar™, or a stainless steel material. In one particular embodiment of the invention disclosed herein, the transducer provides for a resolution of 10 milli-G with a 0.1 pm Bragg wavelength shift of force-sensitive FBG 24 over a typical operating range of a 0 to 80 G and up to 150° C.

The end portions 21a, 21b of the flexure 12 support the cylindrical optical element 20. More specifically, the first end portion 21a contains a through hole for accommodating a cylindrical Invar™ spacer 16, and the second end portion 21b similarly accommodates a cylindrical temperature compensator 18, whose function will be explained in further detail later in this disclosure. As shown in FIG. 1A, both the temperature compensator 18 and the spacer 16 have beveled edges for meeting with similar edges on the optical element 20, thereby providing a good contact for axially compressing the optical element. During manufacturing, one of the compensator 18 or spacer 16 is first welded into place within its end of the flexure 12. Then the optical element is positioned through the other end of the flexure, and the other of the compensator 18 or spacer 16 positioned in place and similarly welded.

The optical element is preferably axially precompressed within the flexure 12 as the second of the compensator 18 or spacer 16 are welded in place. Precompression allows axial relaxation (i.e., tensile strain) of the optical element 20 to be assessed, which would occur when the mass moves toward the optical element 20. A precompression force of approximately 5 pounds at room temperature is preferred for the oil/gas applications for which the sensor 10 has been designed, although other free load forces can be used depending on the static or dynamic acceleration forces to be sensed and the dimensions of the components in the sensor. The temperature compensator 18 and/or the spacer 16 are preferably hollow to accommodate an optical fiber 30 that communicates with the optical sensing element 20, as will be explained in detail later.

Figure 1C:
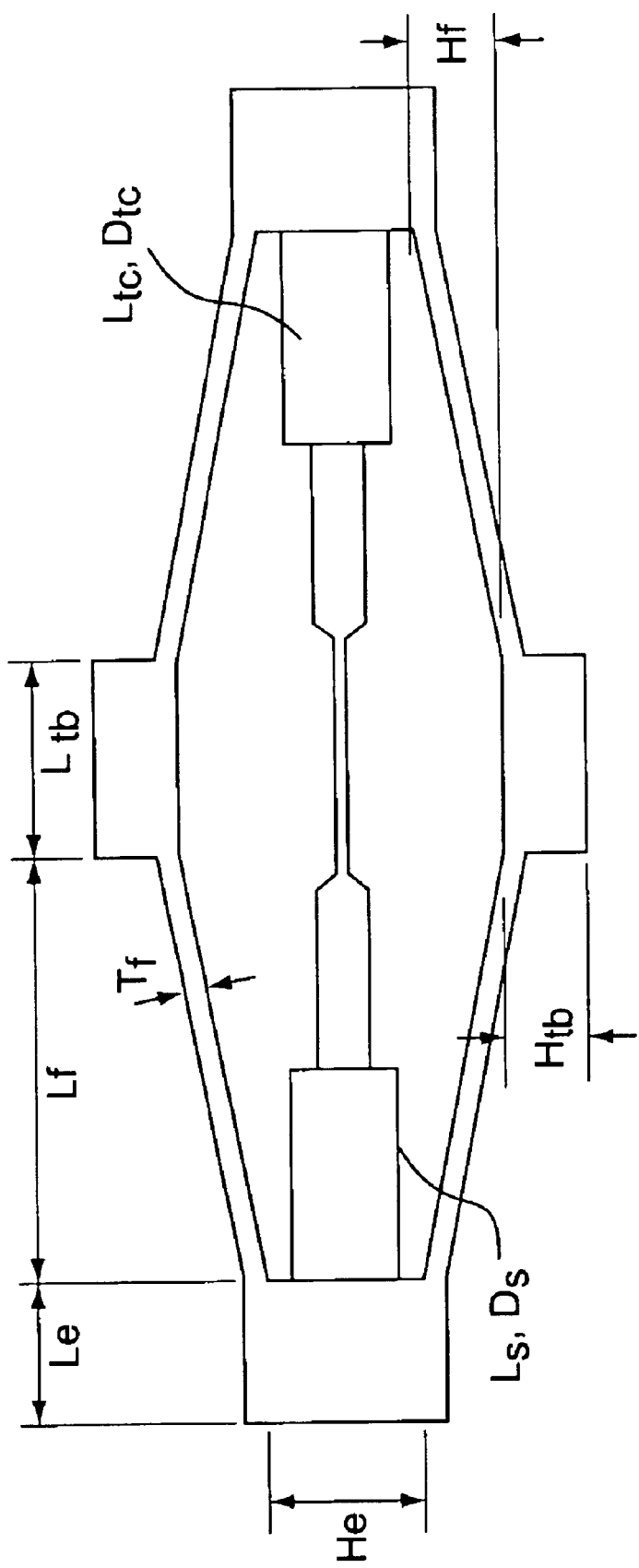
FIGS. 1C and 1D illustrate plan and perspective views the flexure element of the disclosed accelerometer or displacement device, including exemplary dimensions.
Figure 1E:
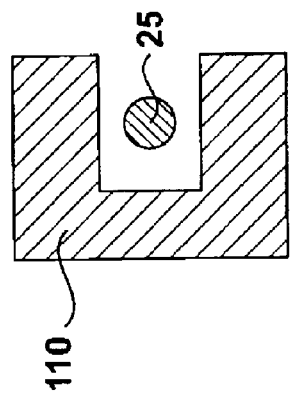
FIG. 1E illustrates a cross sectional view of a reverse pressure stop block useable to prevent overstressing of the flexure.
Figure 1D:
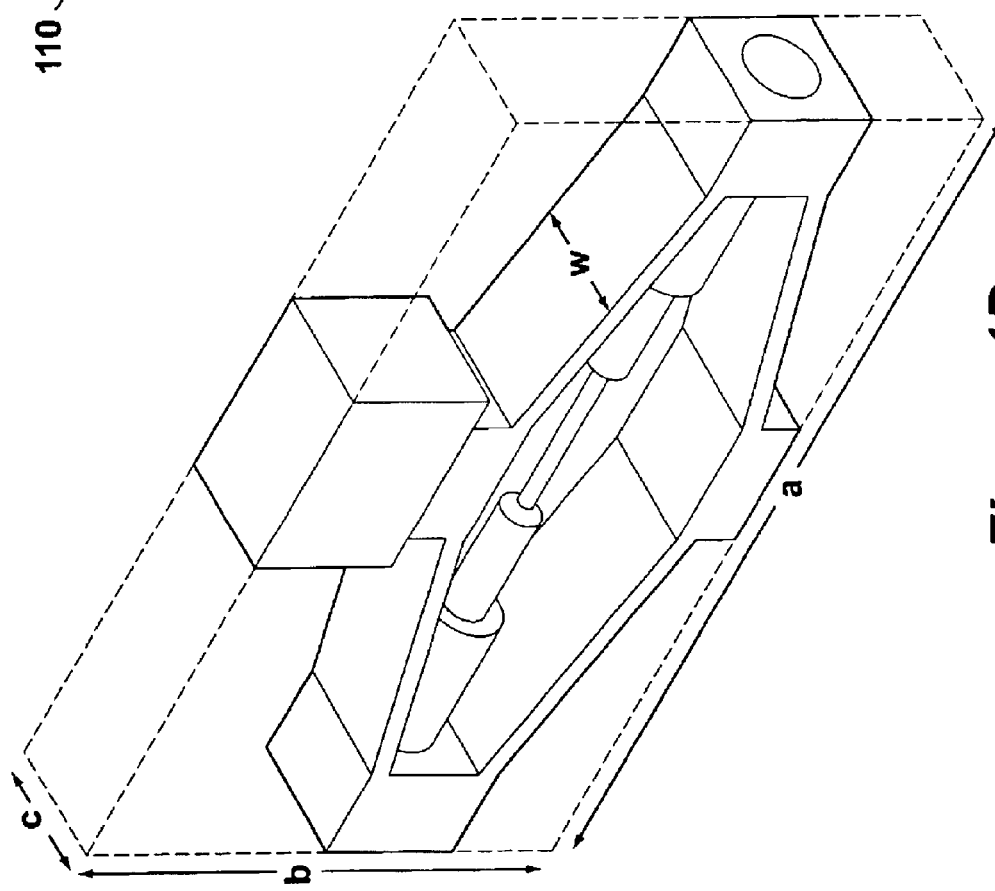

FIGS. 1C and 1D respectively illustrate side and perspective view of the flexure 12 to illustrate exemplary dimensions. Of course, other dimensions are possible depending on the application in which the flexure will be used. In one particular embodiment of the invention, the top and bottom portions have a length ($L_{tb}$) of 0.3 inches and a height of ($H_{tb}$) of 0.12 inches; the upper and lower arms have a length ($L_f$) of 0.645 inches, a height ($H_f$) of 0.12 inches, and a thickness ($T_f$) of 0.050 inches; the end portions have a length ($L_e$) of 0.215 inches and a height ($H_e$) of 0.25 inches. The cylindrical Invar™ spacer 16 and the temperature compensator 18 can have similar dimensions, and preferably have outer diameters ($D_o$) of 0.160 inches and inner diameters ($D_i$) of 0.047 inches. The lengths of these components 16, 18 are less critical, and can vary from approximately 0.5 to 1.0 inches. The width, W, of the flexure 12 is preferably 0.28 inches.

As noted earlier, the mass 14 is coupled to the top of the flexure 12. The mass 14 is preferably formed of a Tungsten alloy such as Densalloy™, or any high-density stable metal. The volume and hence weight of the mass can vary, and is preferably matched to react suitably given the spring constant of the flexure 12; in one embodiment that mass 14 can weigh approximately 23 grams. The mass 14 can take any shape, such as rectangular as shown in the Figures, although a cylindrical shape is preferred for its relative small shape and ease of machining and packaging. In some applications, it is desirable that the flexure 12 be limited in the amount it can expand or contract. Over-expansion of the flexure 12 can cause excessive compression which can damage or buckle the optical element 20, while over-contraction of the flexure can cause the optical element to lose its precompression or possibly fall loose from the flexure. To prevent over-expansion, and referring to FIG. 1A, the mass 14 is preferably limited in the amount it can travel by the housing 41 or, as shown, by a stop block 72 affixed to the housing. The stop block 72 preferably limits the acceleration force to be sensed to approximately 100 G, which corresponds to approximately a 0.003-inch upward shift (U, FIG. 1A) in the flexure 12. To prevent over-contraction, a reverse stop block 110 (FIGS. 1A, 1B) can be employed to limit the compression of the flexure 12. The reverse stop block 110 may be cylindrical, but is preferably roughly C-shaped in cross section, as shown in FIG. 1E. The optical element 20 should be positioned within the interior of the reverse stop block 110 with sufficient space such that the block 110 will not interfere with the optical element. Block 110 can be affixed to the bottom 15 of the flexure 12 by any suitable means, but preferably does not extend so far along the bottom edges 19 of the flexure 12 as to affect its deformability.

Alternatively, in some applications, the optical sensing element 20, compensator/spacer 18/16, and the flexure 12 can be affixed together to allow tensile stresses on the optical element 20 to be assessed without risk of physical detachment of the optical element 20.

Figure 2:
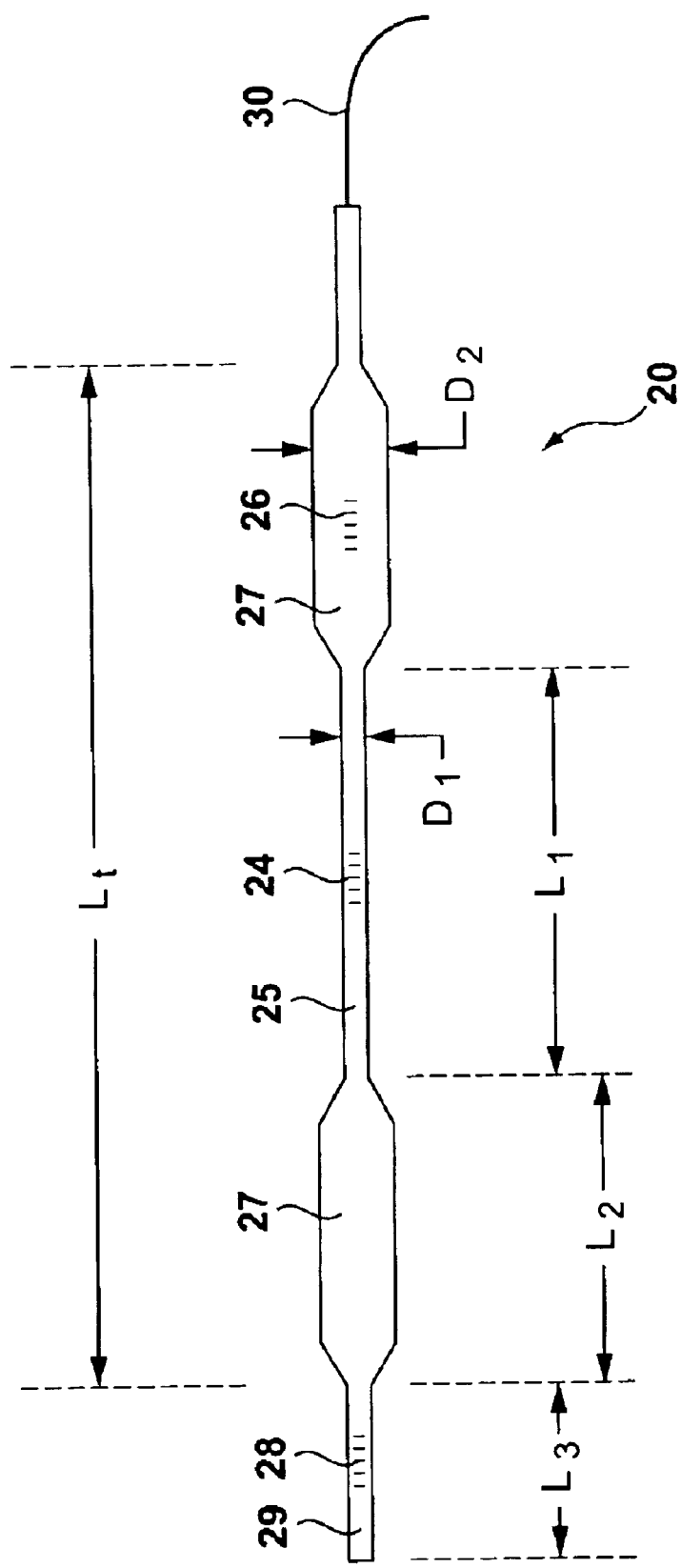
FIG. 2 illustrates an optical sensing element of the disclosed accelerometer or displacement device.

FIG. 2 shows the optical element 20 in isolation, which includes a force-sensitive FBG 24 which responds minimally to temperature and temperature-sensitive FBGs 26 and (optionally) 28. FBG 26 responds minimally to force but does respond to temperature changes. FBG 28 does not respond to force but responds to temperature. The optical element 20 preferably has a "dog bone" shape with a narrow central section 25 and larger outer sections referred to as pistons 27, such as is disclosed in U.S. Pat. No. 6,422,084, entitled "Bragg Grating Pressure Sensor," issued Jul. 23, 2002, which is incorporated herein by reference in its entirety. This particular embodiment of the optical element 20 has the following dimensions: the narrow section has a diameter $D_1$ of about 0.55 mm and a length $L_1$ of about 9 mm; the pistons 27 have diameters $D_2$ of about 2 mm and lengths $L_2$ of about 7 mm. Other lengths $L_1$, $L_2$ of the sections 25, 27 may be used, as long as buckling of the optical element 20 is avoided when it is compressed and the desired sensitivity is achieved. The optical element 20 may further comprise a first and/or second narrow end portion 29. The end portion 29 may have the same, or larger, diameter as the central section 25 and a length $L_3$ that is not critical. So designed, the quartz optical element 20 has a buckling factor of safety of 2 at maximum acceleration force sensing and service temperature.

The ratio of the cross-sectional areas ($\pi r^2$) of the pistons 27 and the narrow section 25 resulting from the dog bone shape of the optical element provides an axial force/area gain of approximately 13.2, meaning that that force-sensitive FBG 24 will experience a 13.2-times greater axial stress than will the pistons 27. This dog bone geometry may be formed by starting with a relatively thick optical waveguide (sometimes referred to as an optical "cane") from which the narrow portion 25 is formed by etching, grinding, or polishing; or the larger diameter portions may be formed by fusing glass tubes around a more standard diameter optical fiber. Such "dog bone" forming schemes are described which more specificity in the incorporated '084 patent. The dimensions provided herein for the optical element 20 are easily scaleable to provide the desired amount of force or vibration sensitivity. Other geometries to enhance sensitivity or to adjust the coupling of force from the flexure 12 to the optical element 20 may be used if desired. Further details concerning cane waveguides can be found in U.S. patent application Ser. No. 10/371,910, filed Feb. 21, 2003, which is incorporated herein by reference in its entirety.

FIG. 2 further discloses a temperature-sensitive FBG 26, which is located in either of the larger piston sections 27. FBG 26, like FBG 24, is sensitive to axial forces because it is positioned in the optical sensing element 20 between the locations where the pistons 27 contact elements 16 and 18. However, the Bragg reflection wavelength shift sensitivities for the FBGs 24, 26 are different. As noted above, because of the force/gain cross sectional area difference between the piston 27 and narrow section 25, FBG 24 will experience a Bragg wavelength shift larger than that of the FBG 26 when the optical element is subjected to axial compression via the flexure 12. By contrast, the FBGs 24, 26 normally would react similarly with respect to temperature, with both experiencing approximately the same relative amounts of Bragg wavelength shift as temperature changes. However, in this embodiment, a temperature compensation scheme is employed that decreases the temperature induced wavelength shift of FBG 24. This technique will be discussed later. Accordingly, and as is known, by assessing the reflection wavelengths of both FBGs 24, 26, force and temperature effects may be analytically separated and solved for. In other words, both temperature and acceleration (or displacement) may be determined, and/or the effects of temperature can be discarded from the acceleration (or displacement) measurement made by the force-sensitive FBG 24.

Yet another means to compensate for the effects of temperature is found in second temperature-sensitive FBG 28. FBG 28 is located at either end portion 29 of the optical element 20, and is only sensitive to temperature, and not to force effects. This is achieved by locating FBG 28 in thermal proximity to the force-sensitive FBG 24, but outside of the piston 27 contact areas. Temperature-sensitive FBG 28 may be located on either or both sides of the optical element 20, and/or may lie inside or outside the spacers/compensators 16/18. The second temperature-sensitive FBG 28 therefore provides an additional means for an accurate and independent temperature measurement, which can be used to calibrate and/or double check the force-sensitive grating 24 as is known, or simply as a means to measure the temperature should that variable be desirable to determine. It should be noted that because the temperature compensation scheme provided by FBG 28 is not impacted by mechanical stressing, and therefore will not suffer from hysteresis effects, FBG 28 may provide a better long-term temperature compensation scheme in some applications.

Although temperature effects can be compensated for using analytical methods in connection with temperature-sensitive FBGS 26 and/or 28, it would be preferable to additionally isolate the force-sensitive FBG 24 from the effects of temperature to improve the resolution of the acceleration or displacement measurement, and to alleviate the need to rely on such analytical methods. The present disclosure provides such an isolation scheme. Specifically, temperature compensator 18 preferably comprises a stainless steel material that has a relatively high coefficient of thermal expansion (CTE). Although the compensator material can be any high CTE material, stainless steel is preferred since it is readily available, cheap, and easy to machine. Thus, when the temperature rises, the compensator 18 will expand axially. The Invar™ spacer 16, on the other hand, has a low coefficient of thermal expansion, so the spacer 16 will not experience a significant expansion. The overall effect of this arrangement is that, as temperature increases, the spacing of the periodicity of the index of refraction perturbations ($\Lambda$) in the FBG 24 will tend to increase due to thermal expansion, but at the same time the temperature compensator 18 will also increase in physical length, which will place the FBG 24 under further compression and decrease the periodicity of the index of refraction perturbations ($\Lambda$) in FBG 24 back toward one another. Thus, the balancing of these two effects means that temperature ultimately does not appreciably affect $\Lambda$ in FBG 24. So thermally compensated, the Bragg reflection wavelength of the pressure-sensitive FBG 24 has a low sensitivity to temperature changes (<1 pm/C) over normal operating temperatures. As an ancillary benefit, temperature compensation allows narrower band radiation to be used to interrogate the Bragg reflection wavelength of the FBG 24 when making an acceleration (or displacement) measurement.

One skilled in the art will realize that temperature compensation will be optimal when the thermal expansion effects of the thermal compensator 18 (relatively great) plus the Invar™ spacer 16 (relatively small) equal the thermal expansion effects and index of refraction changes of the optical element 20 over normal operating ranges. Thus, optimization of the CTE of these components, and/or their lengths, can be adjusted to tune or improve the extent of compensation, which may require routine experimentation in a given application. In this regard, the CTE for all constituent materials of the system are important to consider. Additionally, the wavelength shift as a function of temperature for the optical element 20 (which is equivalent to change in index of refraction over temperature) is likewise important to consider. Accordingly, prior to constructing the transducer, it is useful to characterize the CTE of each batch of material used to form the flexure 12, the Invar™ spacer 16, and the temperature compensator 18 so that slight adjustments in dimensions of these components can be made to appropriately tune the sensor 10. Such matching and optimization suggests that the compensator 18 and spacer 16 may be formed of the same material, optimized to provide the necessary amount of thermal compensation. Therefore, while it is preferred that separate materials are used for these structures, this is not strictly required.

In short, the disclosed sensor 10 preferably incorporates several different means of compensating the acceleration or displacement measurement from the effects of temperature, including FBG 26, FBG 28, and the use of the spacers/compensators 16/18 scheme. One skilled in the art will realize that any one of these temperature compensation schemes, or various combinations, or all, may be used in conjunction with the sensor 10. Regardless of the scheme used, it is preferred that the various FBGs 24, 26, 28 are formed with different grating spacing, so that they exhibit different Bragg reflection wavelengths. In so doing, the FBGs are preferably wavelength division multiplexed (WDM) and are easily resolvable from one another, although this is not strictly necessary. Temperature compensation is not strictly required to enable performance of the sensor, although it is beneficial for the reasons stated earlier.

Figure 3:
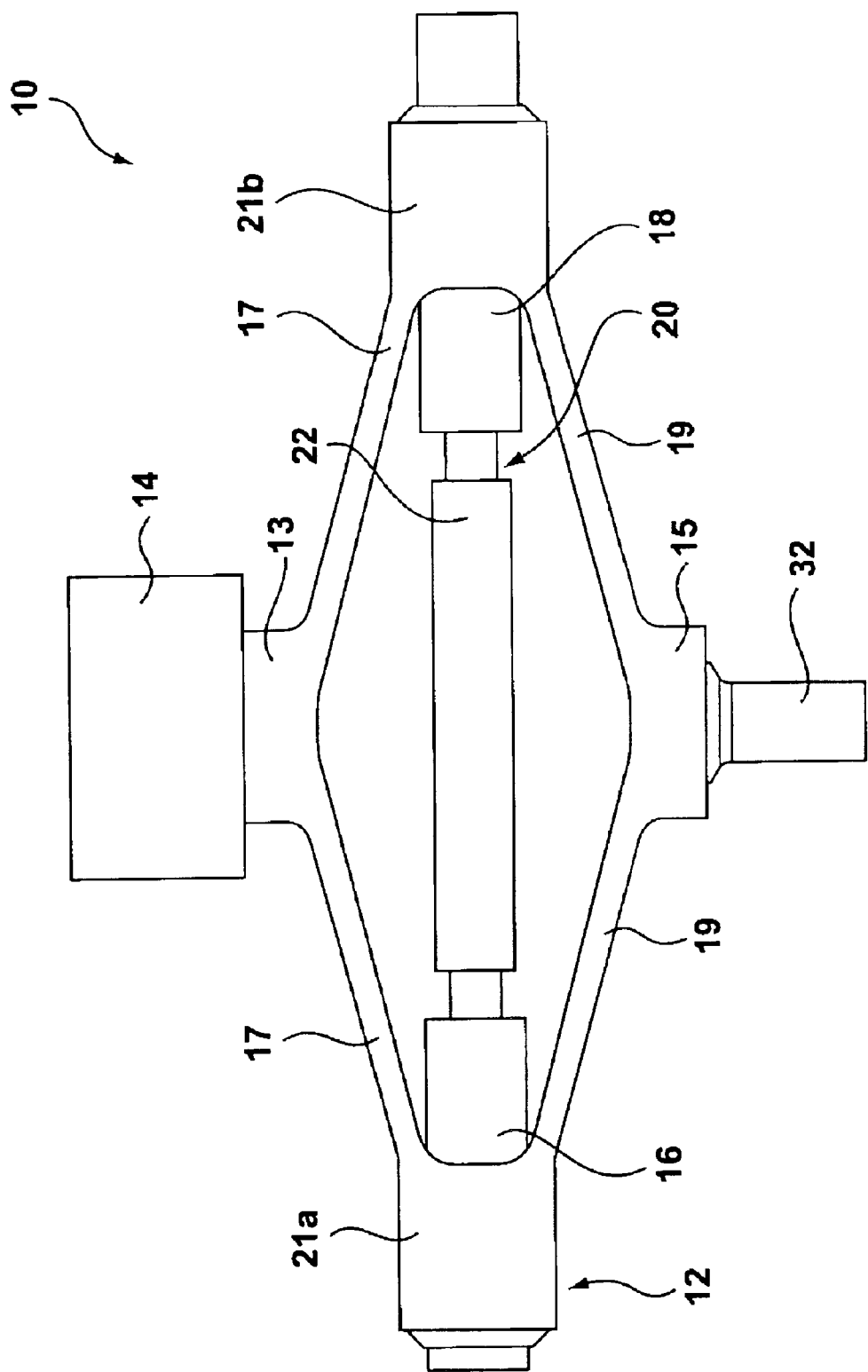
FIG. 3 illustrates a plan view of the disclosed accelerometer or displacement device incorporating a guide sleeve to protect and isolate the optical sensing element.

A cylindrical guide sleeve 22 (FIGS. 1A and 3) can be used to surround the narrow portion 25 of the optical element 20. The sleeve 22 prohibits bending in the narrow portion 25 of the optical element 20, which keeps the device from failing due to excessive shear forces. The sleeve 22 may be formed from the same material as the optical element 20 (e.g., quartz), or may be formed from other like materials, such Pyrex® by Corning (boro silicate), or Vycor® by Corning, or other glasses or plastics. It is preferable that the CTE of the sleeve 22 match that of the optical element 20, although this is not strictly necessary. The sleeve 22 is preferably $CO_2$ laser welded to one of the piston portions 27 of the optical element 20, but is preferably not affixed to both pistons 27 to allow one of the pistons to freely slide within the sleeve 22 without significant restriction in response to axial stresses by the flexure 12. $CO_2$ laser welding of the quartz sleeve 22 and the quartz optical element 20 allows these components to melt together. The radiation from the $CO_2$ laser source is absorbed by the quartz (and similar quartz materials such as Pyrex™, borosilicate glass, Vycor™, etc.), which causes the surface temperature of the glass to heat and eventually reach its softening temperature—approximately 1200 C for fused silica. Because quartz is a poor conductor of heat and the $CO_2$ laser beam is small in diameter (3–5 mm), localized heating of the glass does not transmit to adjacent sections of the optical element 20 in which the FBGs are located, which prevents the FBGs from becoming damaged. The guide sleeve 22 could also less preferably be attached by soldering, gluing, by flame or other heating methods, or by other well-known methods of attachment.

Figure 6:
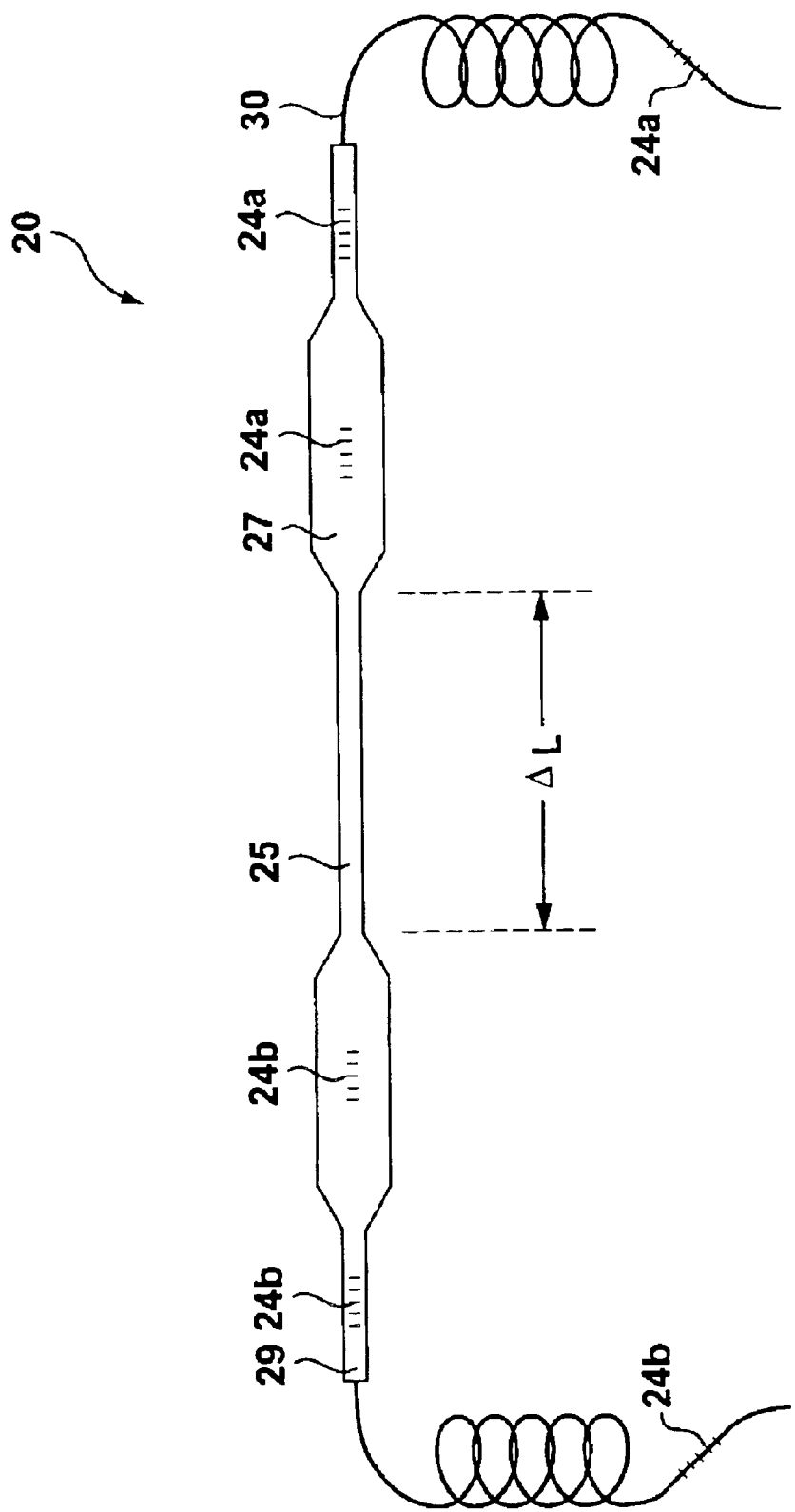
FIG. 6 illustrates the optical sensing element in a configuration suitable for interferometric interrogation.

Structures other than the FBG 24 can comprise the pressure sensitive element within the optical sensing element 20. For example, and as shown in FIG. 6, the narrow portion 25 of the optical element can be formed without an FBG but can still function as the pressure sensitive element. In this embodiment, the stress on narrow portion 25 can be interferometrically interrogated to assess a change in its length, ΔL. In this modification, FBGs 24a and 24b are positioned outside of the pressure sensitive narrow portion 25, for example, in the thicker portions 27 or the end portions 29 as shown. The reflections from these gratings 24a, 24b can be made to coincide and their interference patterns assessed to determine ΔL, and hence the amount of force impingent upon the mass 14. A suitable interferometric technique for determining a change in length in an optical waveguide formed between two FBGs is disclosed in U.S. patent application Ser. No. 09/726,059, entitled "Method and Apparatus for Interrogating Fiber Optic Sensors," filed Nov. 29, 2000, which is incorporated herein by reference. If necessary for proper resolution, the FBGs 24a and 24b may be fixed into the optical fiber 30 connected to both ends of the optical element 20, as is shown.

FIGS. 1A and 2 show an optical fiber 30 coupled to the optical element 20 that ultimately communicates with optical source/detection equipment (not shown). As shown, the sensor 10 is a "single-ended" device, which means that optical fiber 30 is coupled to only one side of the device. In a single-ended device, the free end of optical fiber 30 would be cut and polished to an angle (e.g., 12 degrees) suitable to provide acceptable back reflection. However, "dual-ended" devices capable of being multiplexed with other downstream optical devices are also contemplated. Because the end section 29 of the optical element is significantly thicker than the normal standard communications optical fiber 30, a transitionary structure of an intermediate diameter is preferably used to form a "pig tail" between the two structures. Methods for forming such intermediary structures, sometimes referred to as "large diameter splices," are disclosed in U.S. patent application Ser. No. 10/371,910, entitled "Side Hole Cane Waveguide Sensor," filed Feb. 21, 2003, which is incorporated herein by reference.

The sensor 10 may be deployed down an oil/gas well as will be explained shortly, and accordingly the sensor 10 may be subject to high hydrostatic pressures. Accordingly, the optical fiber 30 preferably exits the housing 41 by means of a hermetic feedthrough seal 47, as shown in FIG. 1A. Suitable optical fiber feedthroughs are disclosed in U.S. Pat. No. 6,445,868, entitled "Optical Fiber Feedthrough Assembly and Method of Making Same," and U.S. patent application Ser. No. 09/628,264, entitled "Optical Fiber Bulkhead Feedthrough Assembly and Method of Making Same," filed Jul. 28, 2000, which are both incorporated by reference in their entireties. Because the feedthrough 47 holds the optical fiber 30 firm as it exits the sensor 10, the optical fiber 30 preferably includes some slack within the housing 41 or the inside of the spacer or compensator 16, 18 as shown. Such slack relieves excess tension on the fiber due to expansion or contraction of the flexure 12, thermal expansion of the housing 41, and/or by movement of the housing 41 during transportation or deployment. Although only one feedthrough 47 is shown, two would be present on opposite ends of the housing 41 if the device were dual-ended. The optical fiber 30 is protected outside of the housing 41 by a metallic cable 48 that protects the optical fiber 30 from the corrosive environment of a typical well bore, as is known. Cable 48 travels along the well bore to connect the sensor 10 with surface instrumentation or other optical devices deployed in the well bore, as will be explained later.

Although preferable, it is not necessary that the optical element 20 be symmetrical, or even that it be "dog bone" shaped. The dog bone shape allows for the axial strain presented to the force-sensitive FBG 24 to be amplified as explained earlier, but this is not strictly necessary, as the device would still function even if FBG 24 did not occur at a narrowed portion 25 of the optical element 20 and hence was not amplified in this manner.

Figure 4:
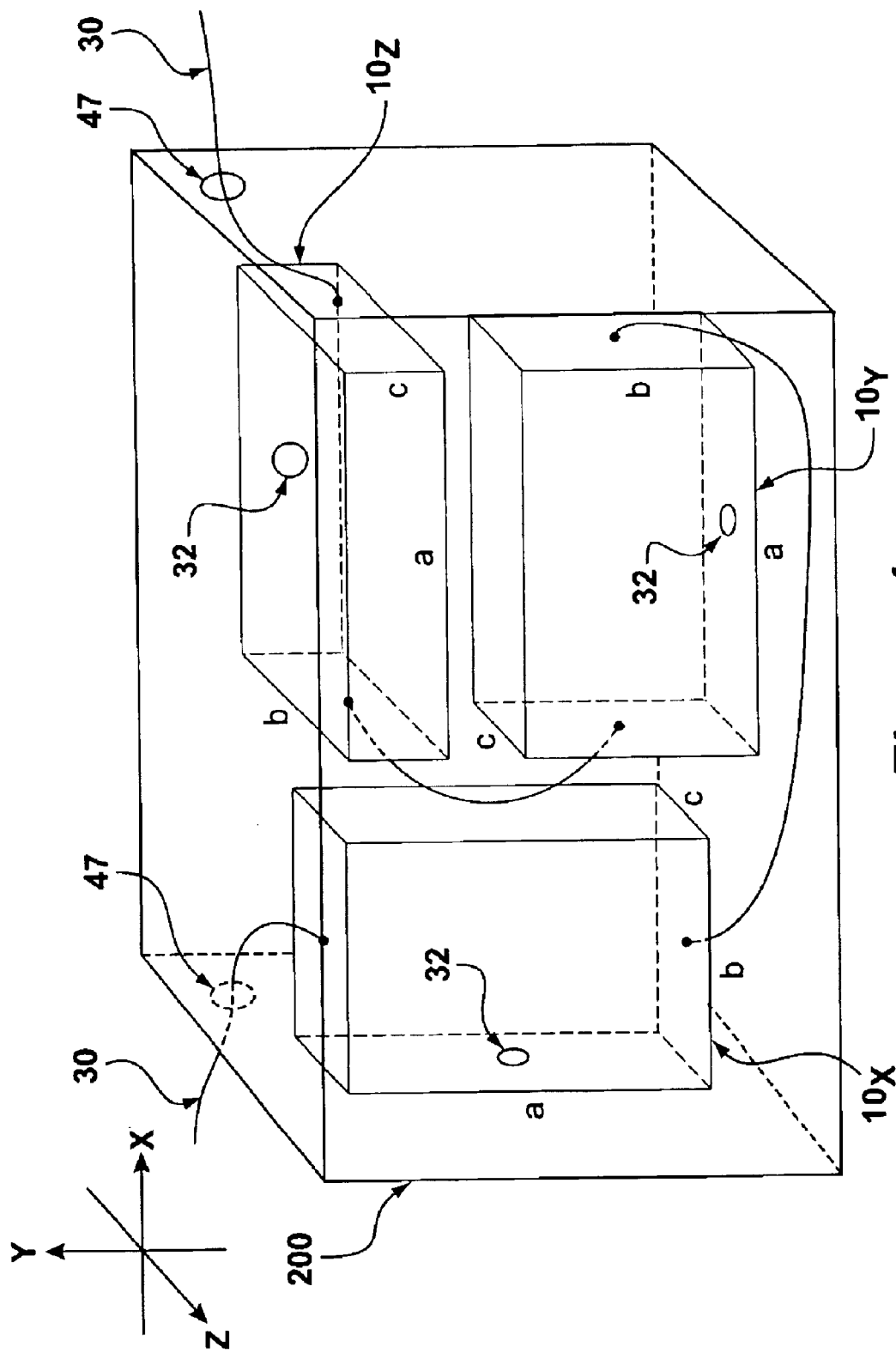
FIG. 4 illustrates the incorporation of three orthogonally-oriented accelerometer or displacement devices into a unitary housing.

As one skilled in the art will appreciate, one sensor 10 can be used to measure static or dynamic forces parallel to the second axis 5, i.e., the axis along which the mass 14 will move or resonate on the flexure 12. Additionally, any force having at least a tangential component lying along the second axis 5 can also be measured. However, in a commercial embodiment, it is generally useful to measure forces in three dimensions, and accordingly, it is useful to use three orthogonally-oriented sensors 10 in tandem. Although three separate sensors 10, each containing their own housings, could be used for this purpose, it is preferred to house three sensors 10 within a single housing so that the sensors' axes can be properly orthogonally aligned with respect to each other. FIG. 4 illustrates such an integrated housing 200 containing three sensors 10 drawn in simplified form to illustrate this approach. In FIG. 4, each sensor 10 is drawn for simplicity as being bounded by a box having dimensions a, b, and c, which corresponds to dimensions a, b, and c in FIG. 1D. Each sensor 10 is affixed to housing 200 using securing pin 32 as noted earlier. One skilled in the art will appreciate that each of the sensors 10 is orthogonally positioned with respect to the other sensors 10, and hence are affixed to different orthogonal walls of the housing. Thus, sensor $10_X$ is affixed to the left wall and is sensitive to forces presented along the X axis; sensor $10_Y$ is affixed to the bottom wall and is sensitive to forces presented along the Y axis; and sensor $10_Z$ is affixed to the back wall and is sensitive to forces presented along the Z axis.

Although not strictly required, it is preferred that the individual sensors $10_X$, $10_Y$, and $10_Z$ be multiplexed along a common optical fiber 30 as shown, which requires the use of dual-ended sensors as disclosed earlier. To resolve the reflections coming from each of the sensors, it is preferred that the FBGs present in the sensors have unique wavelengths in what is known as a wavelength-division multiplexed (WDM) arrangement, which is well known and not further discussed. As with the individual sensor housing 41 disclosed earlier, integrated housing 200 preferably contains optical fiber feedthroughs 47. In FIG. 4, two feedthroughs 47 are shown in idealized form, one of which allows interrogating light into the housing 200 from the optical source/detection equipment (not shown), and one which allows that light to pass to another optical device present further downstream. If only the sensors in housing 200 are to be interrogated, or if the housing 200 is the last optical device present along optical fiber 30, e.g., along an array, only one feedthrough 47 is required. As before, capped filling ports (45 in FIG. 1A) may be used in conjunction with the housing 200.

One skilled in the art will appreciate that the orientation in FIG. 4 of the sensors 10 in housing 200 is merely exemplary, and that other ways of orienting the sensors in the housing 200 are possible. Because the housing 200 is in one application deployed within an annulus of an oil/gas well, consideration should be paid to packing the sensors 10 into the housing 200 in a dense fashion to conserve space. To ensure a suitably thin design, one or more of the sensors 10 may be modified in shape and size, for example, by changing the flexure 12 to make it more compact. Various stop blocks (72 in FIG. 1A) may be easily integrated with the walls of the integrated housing to prevent overstressing of the sensors 10.

Figure 5:
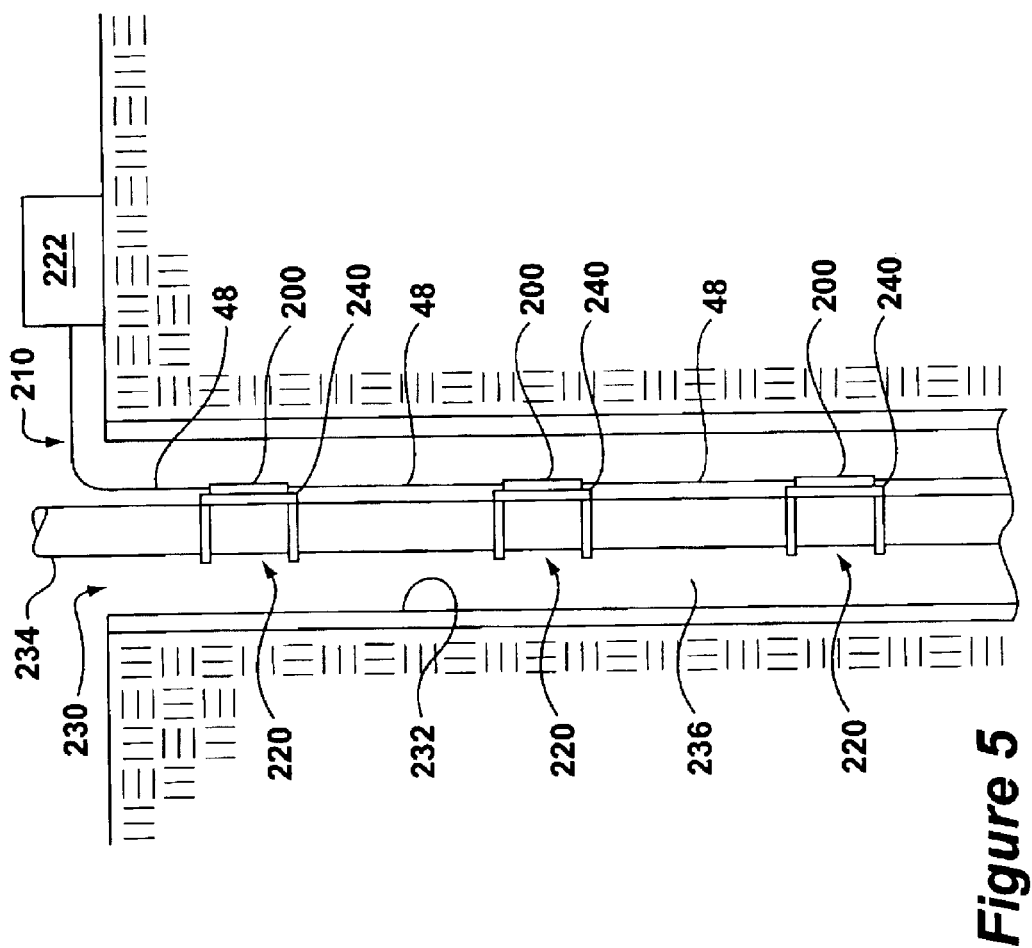
FIG. 5 illustrates the housing of FIG. 4 as used to sense seismic activity in an oil/gas well.

FIG. 5 shows how the integrated housing 200 can be used in an array 210 to assist in in-well seismic exploration of a hydrocarbon reservoir proximate to an oil/gas well 230. The array 210 has a plurality of seismic stations 220 interconnected by inter-station cables 48 as disclosed earlier, which is ultimately connected to optical source-detection equipment 222 residing at the surface of the well 230, which typically includes a demodulator and optical signal processing equipment 222 (not shown). The well 230 has been drilled down to a subsurface production zone and is equipped for the production of petroleum effluents. Typically, the well 230 includes a casing 232 coupled to the surrounding formations by injected cement. Production tubing 234 is lowered into the cased well. The well 230 can be fifteen to twenty thousand feet or more in depth, and the annulus 236 can be filled with a drilling fluid (not shown) having a high temperature and pressure, which presents an extremely corrosive and hostile environment.

As is known in the art, seismology involves the detection of acoustic waves to determine the strata of geologic features, and hence the probable location of petroleum effluents. A seismic generator (not shown) arranged at the surface or in another well is used to generate acoustic waves. Acoustic waves radiate from the generator along direct paths and reflected paths through the various layers of earth. The seismic waves cause the surrounding earth layers to react, and the motion is detected by the sensors 10 in the housing 200. Resulting signals are transmitted through the inter-station cables 48 to the optical source/detection equipment 222. Because each of the housings 200 contains orthogonally-oriented sensors 10, a three-dimension assessment of the detected seismic waves can be procured and processed using known techniques to provide a profile of the reservoir surrounding the well 230. When performing in-well seismic profiling, the seismic stations 220 of the array 210 are distributed over a known length, for example, 5000 feet. Over the known length, the seismic stations 220 can be evenly spaced at desired intervals, such as every 10 to 20 feet, for providing a desired resolution. Because fiber optic connectors (not shown) on the inter-station cables 48 between the housings 200 can generate signal loss and back reflection of the signal, the use of such connectors is preferably minimized or eliminated in the array 210, and instead splicing of the optical fiber 30 within the cables 48 are preferred.

It is preferred in in-well seismology that the sensors 10 be brought into firm contact with the casing 232 of the well to prevent attenuation of seismic waves within the well's annulus 236. Accordingly, in a preferred arrangement, the seismic stations 220 include active clamp mechanisms 240 for bringing the housing 200 into contact with the casing 232 once the seismic station 220 is in the proper position within the well 230. An active clamp useful in this regard is disclosed in U.S. Patent Application Ser. No. 60/416,932, filed Oct. 6, 2002, which is incorporated herein by reference in its entirety. A preferred system and method for transporting, deploying, and retrieving the housings 200 and clamp mechanisms 240 is disclosed in U.S. patent application Ser. No. 10/266,903, filed Oct. 6, 2002, which is incorporated herein by reference in its entirety. An alternative technique to couple the housing 200 to the casing 232 is disclosed in U.S. patent application Ser. No. 10/266,716, filed Oct. 6, 2002, which is also incorporated herein by reference in its entirety. In the technique disclosed in the '716 application, the housings 200 are incorporated with mandrels (not shown) which are coupled to the production tubing 234. The mandrels are configured to naturally couple to the casing 232 without active activation of a clamp. Of course, the housing 200 in this application is preferably not square (as shown in FIG. 4), but instead would be modified to fit within the well's annulus, which might also require a change in the dimensions and/or orientations of the sensors 10 within the housing.

When used to sense dynamic stresses, such as in a seismology application, the sensors 10 should be interrogated accordingly. In this regard, the force sensitive element (e.g., FBG 24 in FIG. 1, or the interferometrically-interrogated narrow portion in FIG. 6) can be periodically interrogated with pulses of light. However, in some applications it may not be practical to periodically interrogate the sensing element, as the rate of the pulses may be too slow to resolve quick stress events or stress events comprised of high frequency components. This is of less concern, and periodic sampling is suitable, when the sensor 10 is used to sense constant (or quasi-constant) forces, like gravity, which change slowly over time if at all.

Figures 7A, 7B, 7C:
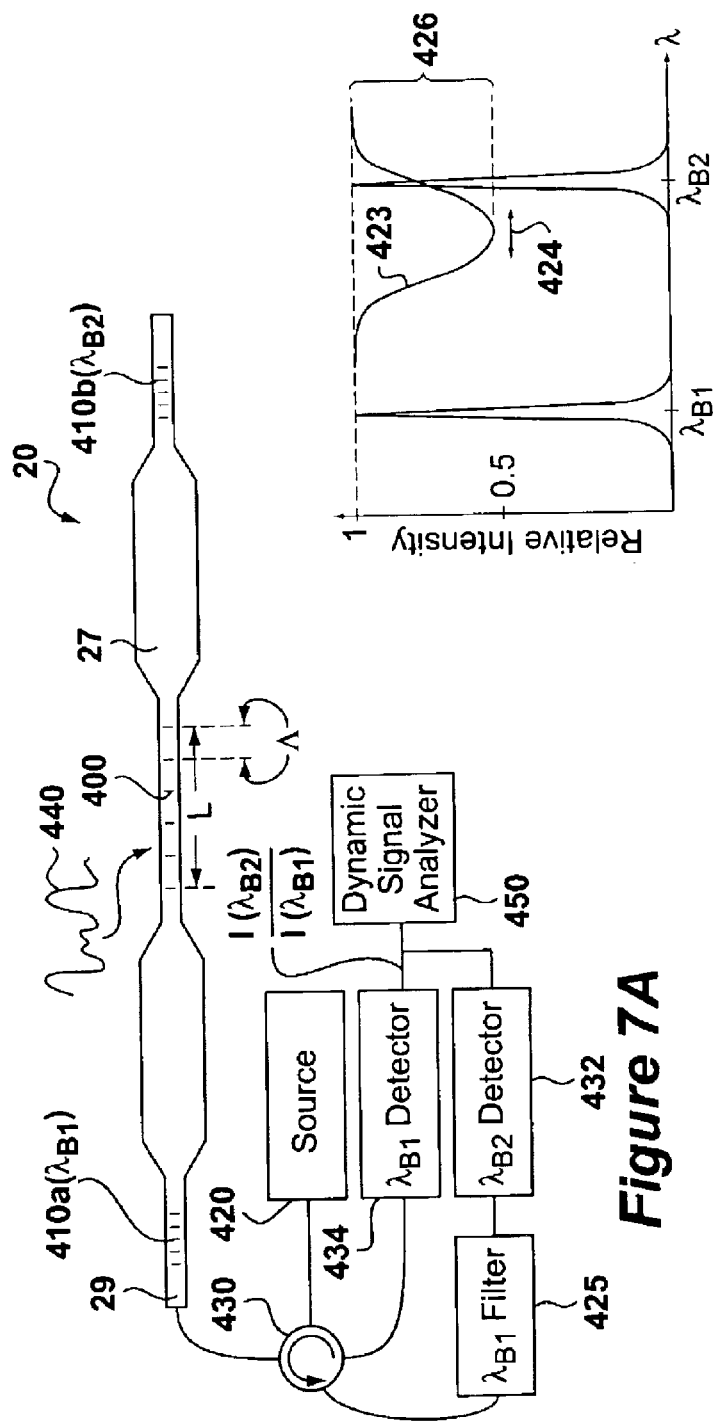
FIGS. 7A–7C illustrate a method for interrogating the optical element using a long period grating.

However, for measuring dynamic stresses, it is preferred to interrogate the sensors 10 with a continuous wave light sources and to continually monitor its reflections in real time. Two such methods are disclosed in FIGS. 7 and 8. Referring to FIG. 7A, the narrow portion 25 of the optical element 30 includes a long period grating (LPG) 400. The spacing Λ of the index of refraction modulation in an LPG 400 is greater than normally used in a narrow band Bragg reflector, ranging on an order of about 100 microns, and stretching over a length of 2 cm across the narrow portion 25. The LPG 400 provides coupling of light propagating in the waveguide to forward propagating cladding modes which are eventually lost due to absorption and scattering. The LPG 400 can be customized to couple light of specific wavelength bands into the cladding. The LPG 400 is bounded by shorter reflective FBGs 410*a* and 410*b* having Bragg reflection wavelengths $\lambda_{B1}$ and $\lambda_{B2}$ of, for example, 1530 nm and 1550 nm respectively. Because these FBGs 410*a*, 410*b* are not used in this embodiment as the strain sensitive element, FBGs 410*a*, 410*b* are preferably formed in the non-force sensitive region of the optical element, i.e., end regions 29. However, this is not strictly necessary. The FBGs 410*a*, 410*b* can tolerate a minimal strain in this embodiment, and therefore can be located within the piston portions 27 as well.

Continuous wave light from light source 420 enters an optical circulator 430, which directs the light to the sensor 10 containing the LPG 400 and FBGs 410*a*, 410*b*. As shown in FIG. 7B, the LPG 400 imparts an insertion loss 423 to a relatively broad spectrum of light that passes through it. The dynamic strain 440 changes the spacing of the index of refraction modulation for the LPG 400, which causes every point in the transmitted spectral profile 423 to shift in wavelength, as shown at 424. Accordingly, while light reflected from the first FBG 410*a* at $\lambda_{B1}$ is not attenuated, light reflected from the second grating 410*b* at $\lambda_{B2}$ will be attenuated in its intensity over region 426 in proportion to the dynamic strain 440 presented to the LPG 400. (One skilled in the art will recognize that light at wavelength $\lambda_{B2}$ is attenuated twice, because the incident light must pass to and from the second FBG 410*b*, and thus will pass through the long period grating twice; this multiplicative effect on the intensity is not shown in FIG. 7B for simplicity.)

This reflected light from the FBGs 410*a*, 410*b* then proceeds by way of circulator 430 to high frequency detectors 432 and 434. Detector 432 detects light tuned to the Bragg reflection wavelength of the second FBG, $\lambda_{B2}$. Light tuned to $\lambda_{B1}$, by contrast, is reflected by filter 425 and directed by circulator 430 to detector 434 where it is assessed. By comparing the intensity of this reflected signal $I(\lambda_{B2})$ at detector 432 with the intensity of the signal reflected from the first Bragg grating $I(\lambda_{B1})$ at detector 434, the dynamic strain 440 imparted to the optical element 20 can be recreated in real time as shown in FIG. 7C. Thereafter, the resulting signal can be assessed pursuant to well known signal analysis techniques; for example, the signal's frequency components using a dynamic signal analyzer 450, which is well known.

In this scheme, $I(\lambda_{B1})$ is used to normalize $I(\lambda_{B2})$, i.e., to remove attenuation losses in the system that are not due to stresses impingent upon the LPG 400. As noted earlier, this technique is beneficial in that it can operate with a continuous wave light source instead of by high rate sampling (although sampling can also be used), which allows detection of higher frequency components present in the dynamic strain 440. The detectors 432 and 434 are accordingly preferably high frequency detectors capable of resolving the higher frequency components of interest in the dynamic strain 440. Either a broadband source, or at least a source containing frequency components tuned to the two FBGs 410*a*, 410*b*, is suitable. Further details concerning this interrogation technique are disclosed in U.S. patent application [attorney docket number WEAF198], entitled "An Optical Sensor Using A Long Period Grating Suitable for Dynamic Interrogation," which is filed concurrently herewith and is incorporated herein by reference in its entirety. One skilled in the art should note that separate detectors 432 and 434 need not be used, and that a single detector capable of sensing both FBG reflections can be used instead.

Another continuous wave method of interrogating the sensors and suitable for the detection of dynamic stresses is illustrated in FIG. 8A. In this embodiment, the force-sensitive element within optical element 20 comprises a typical FBG 24 such as was disclosed earlier in this specification. The interrogation equipment comprises a tunable narrow-width laser source 500. Prior to actual interrogation of the optical element 20 in a useful measuring application, the FBG 24 is initially interrogated (i.e., in the measurement environment, but prior to measurement) by sweeping the wavelength of the tunable source 500 around the Bragg reflection wavelength $\lambda_B$ of the FBG 24 or by averaging several sweeps in a time-varying strain environment. By measuring the intensity of the reflection at detector 520, the full reflection profile 520 of the FBG 24 can be deduced and stored in the detector 510 (or associated interrogation/detection electronics), as shown in FIG. 8B. After determining this initial profile 520 for the FBG 24, the tunable source 500 is fixed at a wavelength $\lambda_{tune}$ which falls upon one of the sloped edges of the profile 520. Thereafter, when the optical element is subject to a dynamic strain 440, the initial profile 520 will shift accordingly. If the strain 440 at one point in time causes the strain on the FBG 24 to be relieved (i.e., by the mass pressing on the flexure 12), the initial reflection profile 520 will shift to higher wavelengths, shown as profile 520⁺. By contrast, if the strain 440 at a different point in time causes the strain on the FBG 24 to increase (i.e., by the mass 14 moving away from the flexure 12), the initial reflection profile 520 will shift to lower wavelengths, shown as profile 520⁻. This shifting of the initial profile 520 causes the intensity of light reflected at $\lambda_{tune}$ to change, with the intensity increasing for downward shifts (520⁻) and decreasing for upward shifts (520⁺). By knowing the shape of the initial profile 520, the intensity of light reflected at $\lambda_{tune}$, $I(\lambda_{tune})$, can be monitored as a function of time, as shown in FIG. 8C, to quantify the shift in the Bragg reflection wavelength of the FBG 24, and hence the force or acceleration that is acting on the mass 14. Like the interrogation embodiment of FIG. 7, the source 500 in this embodiment can constitute a continuous wave source, although sampling can also be used. As in FIG. 7, the detector 510 is preferably able to discern the highest frequencies of interest in the dynamic strain and is preferably associated with a dynamic signal analyzer 530.

Figure 9:
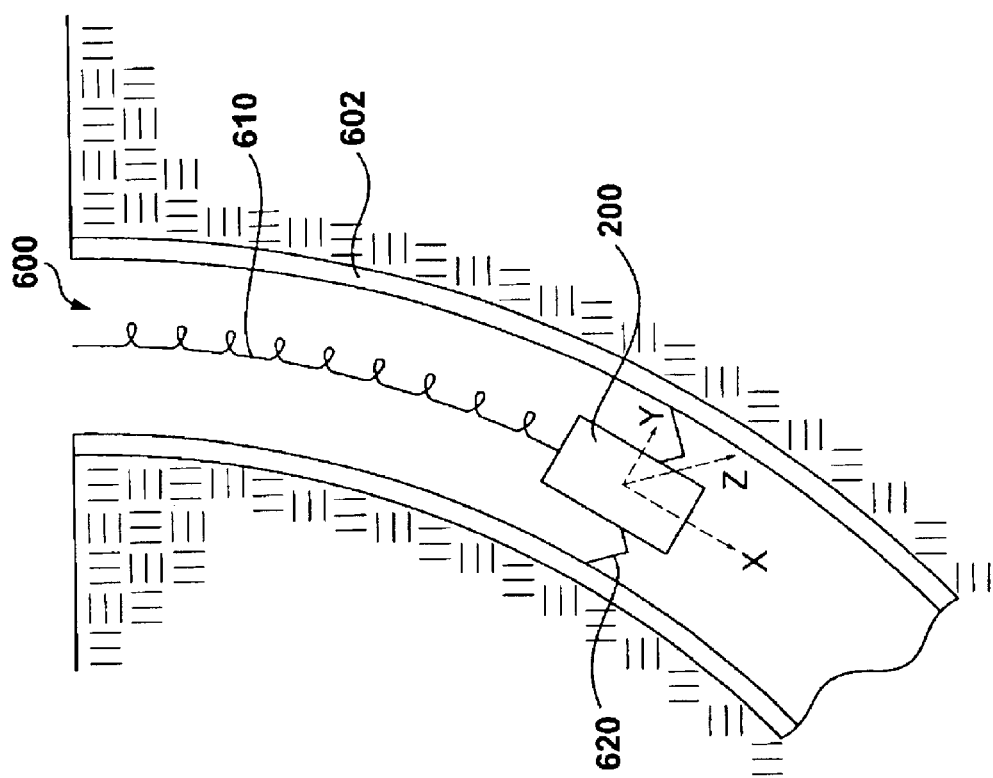
FIG. 9 illustrates use of the housing of FIG. 4 to measure deviation in an oil/gas well.

FIG. 9 shows how the integrated housing 200 (FIG. 4) can be used as a displacement device to determine the extent of deviation in an oil/gas well 600. In this application, the housing 200 is deployed by a wireline or a coiled tubing 610 into the well 600, which is preferably cased 602 and ready for production. To keep the housing 200 centralized with the well and aligned with the well's deviation, leaf springs 620 can be used; other well-known devices, such as spring mounted rollers or wheels attached to the housing 200 can also be used. As the well deviates, the three orthogonally oriented sensors 10 with the housing 200 will start to displace from their initial positions due to gravitational influence on the change in inclination of the device. By analyzing the degree of displacement of each of the sensors 10, and computing the tangential effect of gravity on each of the sensors, the orientation of the housing, and thus the deviation of the well at the housing particular position, can be determined.

In a preferred method for mapping the deviation of the well 600 along a desired length, the housing 200 is first pushed into the well 600 using wireline 610 to the lowest position at which a displacement measurement is to be taken. A "wireline tractor" can be used to assist in deployment of the housing 200 down hole if necessary. Then the housing 200 is pulled up the well at a known rate, with displacement measurements being taken either continuously or at desired intervals along the length of the well. Of course, this process can be reversed, with measurement data taken as the housing 200 is deployed down the well.

Such well deviation information is useful for a number of reasons. For example, it can be used as a check on deviation data gathered while drilling (i.e., using so-called Measurement While Drilling (MWD) techniques); or it can be used to calibrate or correct the orientation of seismic sensors deployed down hole to improve the quality of the measured seismic data. Additionally, if the disclosed housing 200 structure is used to make seismic measurements as was disclosed in FIG. 5, such deviation data can be taken once the housing 200 is deployed and set and prior to the acquisition of seismic data, obviating the need to take deviation data as a separate step.

Figure 10:
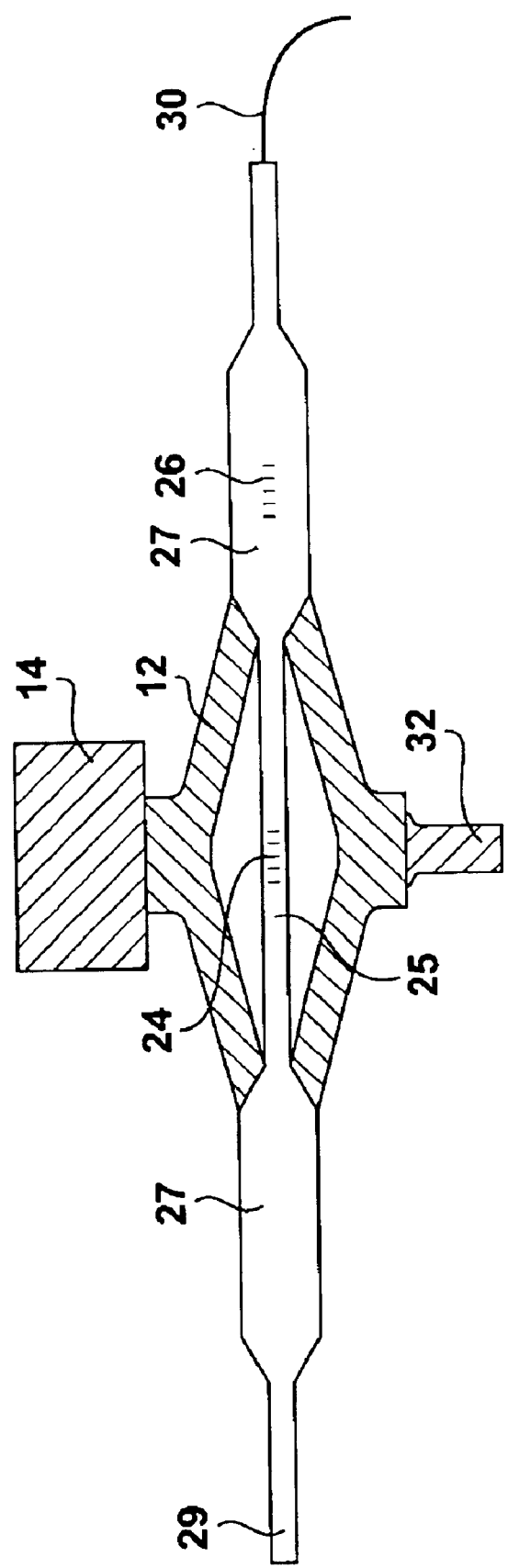
FIG. 10 illustrates an alternative design for the flexure.

Other designs of the sensor 10 are possible. For example, FIG. 10 discloses a variation on the coupling of the optical sensing element 20 and the flexure 12 which can be used with any of the optical element designs or interrogation schemes disclosed above. In this embodiment, the flexure 12 is made to press on the inside beveled edges of the piston portions 27 of the optical element. The optical element 20 is preferably pretensioned within the flexure 12, which can be suitable in some applications. Accordingly, constriction of the flexure 12 by virtue of the mass's 14 movement towards it will cause the pressure sensitive narrow portion 25 to become more tensile. Similarly, expansion of the flexure 12 by virtue of the mass's 14 movement away from it will cause the pressure sensitive portion 25 to compress or relax. Because the piston portions 27 are not subjected to any strain by the flexure 12, optical elements contained within them (e.g., temperature-sensitive FBGs 26) are isolated and need not be corrected. Moreover, because this alternative design places the flexure 12 within inside beveled edges of the piston portions 27, the flexure 12 can take on a smaller shape. A smaller shape can be beneficial in applications calling for measuring forces in tight spaces, such as within the annulus of an oil/gas well as described earlier.

While it is preferred that the flexure 12 house an optical sensing element 20, other optical or non-optical sensing elements (e.g., Fabry-Perot cavity, electrical sensing elements, piezoelectric crystals, or strain gauges) that are sensitive to pressure could be used in place of the optical sensing element. If such a modification is desirable, one skilled in the art will realize that structural modifications may need to be made to couple the compressive force of the flexure 12 to the sensing element, which might be greatly different in size and shape when compared to the disclosed optical sensing element 20.

"Coupled" as used in this disclosure should not necessarily be interpreted to require direct contact. Thus, two elements can be said to be "coupled" from a functional standpoint even if an intermediary element intervenes between them.

As used herein, "fiber Bragg grating" or "FBG" do not necessary imply that the grating is contained within a fiber, i.e., a standard communications optical fiber. Any suitable grating for simplicity, and consistent with common nomenclature, is referred to herein as an "fiber Bragg grating" or "FBG" even if it is contained within larger diameter waveguides (e.g., cane-based waveguides) or other optical waveguides which are not fibers, such as those disclosed herein and preferably used in connection with the optical sensing element 20.

Although the disclosed sensors are described as being interrogated by assessing reflection therefrom, those of skill in the art will recognize that assessing transmission of light through the sensors is equally feasible.

Although designed as particularly useful for measuring seismic activity or deviation in oil/gas well applications, the disclosed sensor can be used to sense dynamic and constant forces in any number of applications, including other industrial sensing applications.

What is claimed is:

1. A sensor, comprising:

a flexure;

an optical sensor coupled to the flexure and having a first axis, wherein at least a portion of the optical sensor is deformable along the first axis; and a mass coupled to the flexure and moveable along a second axis perpendicular to the first axis, wherein motion of the mass along the second axis causes the flexure to deform the optical sensor, wherein the deformation of the optical sensor is substantially confined to the first axis.

2. The sensor of claim 1, wherein the mass responds to a force.

3. The sensor of claim 2, wherein the force is selected from a group consisting of an acceleration and a displacement.

4. The sensor of claim 1, wherein the flexure is rhomboid shaped.

5. The sensor of claim 1, wherein the optical sensor comprises at least one of either a compression or tension sensitive periodic or nonperiodic change in a refractive index of the sensor.

6. The sensor of claim 5, wherein the periodic or nonperiodic change in the refractive index comprises a FBG or a long period grating.

7. The sensor of claim 5, wherein the optical sensor further comprises at least one temperature sensitive FBG.

8. The sensor of claim 7, wherein the temperature sensitive FBG is not located at a deformable portion of the optical sensor.

9. A sensor, comprising:
  a flexure;
  an optical sensor coupled to the flexure and having a first axis, wherein at least a portion of the optical sensor is deformable along the first axis and the optical sensor comprises at least one of either a compression or tension sensitive periodic or nonperiodic change in a refractive index of the sensor;
  a mass coupled to the flexure and moveable along a second axis perpendicular to the first axis, and
  a temperature compensator block along the first axis between at least one end of the optical sensor and the flexure, wherein the temperature compensator thermally expands to compress the optical sensor along the first axis to counteract thermal expansion of the optical sensor.

10. The sensor of claim 1, further comprising a housing, wherein the flexure is affixed to the housing.

11. The sensor of claim 10, wherein the housing is filled with a liquid.

12. The sensor of claim 1, wherein the optical sensor has a narrowed portion surrounded by thicker portions.

13. The sensor of claim 12, wherein a pressure sensitive FBG is located at the narrowed portion.

14. The sensor of claim 13, wherein the optical sensor is deformable by virtue of engagement between the flexure and the thicker portions.

15. The sensor of claim 1, wherein the optical sensor is contained within the flexure.

16. The sensor of claim 1, wherein the optical sensor comprises a long period grating.

17. The sensor of claim 16, wherein the long period grating is bounded by two FBGs.

18. An apparatus, comprising:
  a flexure;
  a sensor coupled to the flexure and having a first axis, wherein at least a portion of the sensor is deformable along the first axis in response to deformation of the flexure; and
  a mass coupled to the flexure and moveable along a second axis substantially perpendicular to the first axis for deforming the sensor along the first axis in response to a force, wherein the deformation of the optical sensor is substantially confined to the first axis.

19. The apparatus of claim 18, wherein the force is selected from a group consisting of an acceleration and a displacement.

20. The apparatus of claim 18, wherein the flexure is rhomboid shaped.

21. The apparatus of claim 18, wherein the sensor comprises an optical sensor.

22. The apparatus of claim 21, wherein the optical sensor comprises at least one of either a compression or tension sensitive periodic or nonperiodic change in a refractive index of the sensor.

23. The apparatus of claim 22, wherein the periodic or nonperiodic change in the refractive index comprises a FBG or a long period grating.

24. The apparatus of claim 22, wherein the optical sensor further comprises at least one temperature sensitive FBG.

25. The apparatus of claim 24, wherein the temperature sensitive FBG is not located at a deformable portion of the optical sensor.

26. The apparatus of claim 22, further comprising a temperature compensator block along the first axis between at least one end of the optical sensor and the flexure, wherein the temperature compensator thermally expands to compresses the optical sensor along the first axis to counteract thermal expansion of the optical sensor.

27. The apparatus of claim 18, further comprising a housing, wherein the flexure is affixed to the housing.

28. The apparatus of claim 27, wherein the housing is filled with a liquid.

29. The apparatus of claim 21, wherein the optical sensor has a narrowed portion surrounded by thicker portions.

30. The apparatus of claim 29, wherein a pressure sensitive FBG is located at the narrowed portion.

31. The apparatus of claim 30, wherein the optical sensor is deformable by virtue of engagement between the flexure and the thicker portions.

32. The apparatus of claim 18, wherein the sensor is contained within the flexure.

33. The apparatus of claim 21, wherein the optical sensor comprises a long period grating.

34. The apparatus of claim 33, wherein the long period grating is bounded by two FBGs.

35. A sensor system for measuring forces in three dimensions, comprising:
  a first, second, and third sensor, each comprising:
    a flexure;
    an optical sensor coupled to the flexure, wherein at least a portion of the optical sensor is deformable, wherein the deformation of the optical sensor is substantially confined to the first axis; and
    a mass coupled to the flexure and moveable along an axis perpendicular to the optical sensor,
  wherein the axis of each of the first, second, and third sensors are orthogonal to each other.

36. The sensor system of claim 35, wherein the mass responds to a force.

37. The sensor system of claim 36, wherein the force is selected from a group consisting of an acceleration and a displacement.

38. The sensor system of claim 35, wherein the flexure is rhomboid shaped.

39. The sensor system of claim 35, wherein the optical sensor comprises at least one of either a compression or tension sensitive periodic or nonperiodic change in a refractive index of the sensor.

40. The sensor system of claim 39, wherein the periodic or nonperiodic change in the refractive index comprises a FBG or a long period grating.

41. The sensor system of claim 39, wherein the optical sensor further comprises at least one temperature sensitive FBG.

42. The sensor system of claim 41, wherein the temperature sensitive FBG is not located at a deformable portion of the optical sensor.

43. The sensor system of claim 39, further comprising a temperature compensator block along the first axis between at least one end of the optical sensor and the flexure, wherein the temperature compensator thermally expands to compresses the optical sensor along the first axis to counteract thermal expansion of the optical sensor.

44. The sensor system of claim 35, further comprising a housing, wherein the first, second, and third sensors are affixed to the housing.

45. The sensor system of claim 44, wherein the housing is filled with a liquid.

46. The sensor system of claim 35, wherein the optical sensor has a narrowed portion surrounded by thicker portions.

47. The sensor system of claim 46, wherein a pressure sensitive FBG is located at the narrowed portion.

48. The sensor system of claim 47, wherein the optical sensor is deformable by virtue of engagement between the flexure and the thicker portions.

49. The sensor system of claim 35, wherein the optical sensor is contained within the flexure.

50. The sensor system of claim 35, wherein the optical sensor comprises a long period grating.

51. The sensor system of claim 50, wherein the long period grating is bounded by two FBGs.

52. A system for sensing an acceleration or a displacement, comprising:
   a flexure;
   an optical sensor coupled to the flexure and having a first axis, wherein at least a portion of the optical sensor is deformable along the first axis, wherein the deformation of the optical sensor is substantially confined to the first axis;
   a mass coupled to the flexure and moveable along a second axis perpendicular to the first axis; and
   optical interrogation and detection equipment coupled to the optical sensor.

53. The system of claim 52, wherein the mass responds to a force.

54. The system of claim 53, wherein the force is selected from a group consisting of an acceleration and a displacement.

55. The system of claim 52, wherein the flexure is rhomboid shaped.

56. The sensor system of claim 52, wherein the optical sensor comprises at least one of either a compression or tension sensitive periodic or nonperiodic change in a refractive index of the sensor.

57. The sensor system of claim 56, wherein the periodic or nonperiodic change in the refractive index comprises a FBG or a long period grating.

58. The system of claim 56, wherein the optical sensor further comprises at least one temperature sensitive FBG.

59. The system of claim 58, wherein the temperature sensitive FBG is not located at a deformable portion of the optical sensor.

60. The system of claim 52, further comprising a housing, wherein the flexure is affixed to the housing.

61. The system of claim 60, wherein the housing is filled with a liquid.

62. The system of claim 52, wherein the optical sensor has a narrowed portion surrounded by thicker portions.

63. The system of claim 62, wherein a pressure sensitive FBG is located at the narrowed portion.

64. The system of claim 52, wherein the optical interrogation and detection equipment comprises an interrogator for directing pulsed light to the optical sensor.

65. The system of claim 52, wherein the optical interrogation and detection equipment comprises an interrogator for directing continuous wave light to the optical sensor.

66. The system of claim 65, wherein the optical sensor comprises a long period grating.

67. The system of claim 66, wherein the long period grating is bounded by two FBGs.

68. The system of claim 52, wherein the sensor is deployed down a well, and wherein the optical interrogation and detection equipment resides at the surface of a well.

69. A method for sensing a force using an optical sensor contained within a flexible body along a first axis, comprising placing a force on a mass coupled to the flexible body along a second axis perpendicular to the first axis, thereby deforming the body and at least a portion of the optical sensor, wherein the deformation of the optical sensor is substantially confined to the first axis.

70. The method of claim 69, wherein the force comprises an acceleration or a displacement.

71. The method of claim 69, wherein the flexible body is rhomboid shaped.

72. The method of claim 69, wherein the optical sensor comprises at least one of either a compression or tension sensitive periodic or nonperiodic change in a refractive index of the sensor.

73. The method of claim 72, wherein the periodic or nonperiodic change in the refractive index comprises a FBG or a long period grating.

74. The method of claim 72, wherein the optical sensor further comprises at least one temperature sensitive FBG.

75. The method of claim 74, wherein the temperature sensitive FBG is not located at a deformable portion of the optical sensor.

76. A method for sensing a force using an optical sensor contained within a flexible body along a first axis, comprising:
   placing a force on a mass coupled to the flexible body along a second axis perpendicular to the first axis, thereby deforming the body and at least a portion of the optical sensor along the first axis, wherein the optical sensor comprises at least one of either a compression or tension sensitive periodic or nonperiodic change in a refractive index of the sensor; and
   compensating for temperature effects by positioning a temperature compensator along the first axis between at least one end of the optical sensor and the flexible body, wherein the temperature compensator thermally expands to compresses the optical sensor along the first axis to counteract thermal expansion of the optical sensor.

77. The method of claim 69, wherein the flexible body is affixed within a housing.

78. The method of claim 77, wherein the housing is filled with a liquid.

79. The method of claim 69, wherein the optical sensor has a narrowed portion surrounded by thicker portions.

80. The method of claim 79, wherein a pressure sensitive FBG is located at the narrowed portion.

81. The method of claim 80, wherein the optical sensor is deformed by virtue of engagement between the flexible body and the thicker portions.

* * * * *